United States Patent [19]
Ide et al.

[11] Patent Number: 5,344,129
[45] Date of Patent: * Sep. 6, 1994

[54] ELASTIC MOUNT HAVING FLUID CHAMBER PARTIALLY DEFINED BY OSCILLATING PLATE ACTUATED BY MOVING COIL IN ANNULAR GAP BETWEEN TWO YOKES CONNECTED TO PERMANENT MAGNET

[75] Inventors: Akiyoshi Ide, Inuyama; Katsuhiro Goto, Komaki; Yutaka Ishioka, Nagoya; Yoshiki Funahashi, Iwakura; Rentaro Kato; Tetsu Matsui, both of Kasugai; Ryouji Kanda, Komaki; Atsushi Muramatsu, Komaki; Keiichi Ishiba, Komaki, all of Japan

[73] Assignee: Tokai Rubber Industries, Ltd., Japan

[*] Notice: The portion of the term of this patent subsequent to Oct. 5, 2010 has been disclaimed.

[21] Appl. No.: 985,107

[22] Filed: Dec. 3, 1992

[30] Foreign Application Priority Data

Dec. 6, 1991 [JP] Japan .................. 3-349587

[51] Int. Cl.⁵ .............................. F16M 5/00
[52] U.S. Cl. ................. 267/140.14; 310/256
[58] Field of Search .......... 267/140.14, 140.11, 267/140.13, 140.15, 219, 35; 248/562, 636; 310/256

[56] References Cited

U.S. PATENT DOCUMENTS

| | | | |
|---|---|---|---|
| 3,750,067 | 7/1973 | Fletcher et al. | 335/296 |
| 4,414,437 | 11/1983 | Trauernicht et al. | 179/115.5 VC |
| 4,505,461 | 3/1985 | Kakimoto | 267/140.13 |
| 4,624,435 | 11/1986 | Freudenberg | 267/140.14 X |
| 4,635,910 | 1/1987 | Ozawa et al. | 267/140.14 |
| 4,638,983 | 1/1987 | Idigkeit et al. | 267/140.14 |
| 4,650,170 | 3/1987 | Fukushima | 267/140.14 |
| 4,693,455 | 9/1987 | Andra | 267/140.14 |
| 4,869,474 | 9/1989 | Best et al. | 267/140.14 X |

FOREIGN PATENT DOCUMENTS

| | | |
|---|---|---|
| 59-1828 | 1/1984 | Japan . |
| 59-1829 | 1/1984 | Japan . |
| 9321234 | 12/1984 | Japan .............. 267/140.14 |
| 3-73741 | 7/1991 | Japan . |

Primary Examiner—Robert J. Oberleitner
Assistant Examiner—Peter M. Poon
Attorney, Agent, or Firm—Parkhurst, Wendel & Rossi

[57] ABSTRACT

A fluid-filled elastic mount including an elastic body elastically connecting a first and a second support, and partially defining a fluid chamber filled with a non-compressible fluid. The elastic mount includes an oscillating plate which partially defines the fluid chamber and which is displaceable to change a pressure of the fluid in the fluid chamber, and a permanent magnet disposed on one of opposite sides of the oscillating plate remote from the fluid chamber. A first and a second yoke member are connected to opposite magnetic pole faces of the magnet by a plastic material, and cooperate with the magnet to define a closed magnetic circuit. The yoke members define therebetween an annular gap in the magnetic circuit, in which a magnetic fluid and an annular moving coil are received. The magnetic fluid includes magnetic particles dispersed in a liquid medium. The coil is fixed to the oscillating plate, to oscillate the oscillating plate upon energization of the coil.

8 Claims, 2 Drawing Sheets

ELASTIC MOUNT HAVING FLUID CHAMBER PARTIALLY DEFINED BY OSCILLATING PLATE ACTUATED BY MOVING COIL IN ANNULAR GAP BETWEEN TWO YOKES CONNECTED TO PERMANENT MAGNET

BACKGROUND OF THE INVENTION

1. Field of the Invention

The present invention relates generally to a fluid-filled elastic mount having a fluid chamber partially defined by an oscillating plate which is actuated by an electromagnetic drive device so as to change the fluid pressure in the fluid chamber to thereby control the damping characteristics of the mount. More particularly, the present invention is concerned with such a fluid-filled elastic mount which has an electromagnetic drive device capable of stably producing a large drive force to actuate the oscillating plate.

2. Discussion of the Prior Art

As a vibration damper for flexibly connecting two members in a vibration system or mounting one of the two members on the other member in a vibration damping fashion, there is known an elastic mount interposed between the two members of the vibration system. The elastic mount has an elastic body interposed between and elastically connecting a first and a second support which are respectively fixed to one and the other of the two members of the vibration system. This type of elastic mount may be used as an engine mount or a suspension bushing for a motor vehicle, for example.

Recently, there have been proposed various types of fluid-filled elastic mounts adapted to exhibit sophisticated damping characteristics, wherein the elastic body which elastically connects the first and second supports partially defines a fluid chamber filled with a non-compressible fluid. Some of these fluid-filled elastic mounts are adapted to electrically control the fluid pressure within the fluid chamber, depending upon the type of the input vibrations received, so that the specific vibrations can be suitably damped or isolated.

Examples of such electrically controllable fluid-filled elastic mount are disclosed in JP-A-59-1828, JP-A-59-1829 and JP-U-3-73741, wherein the fluid chamber is partially defined by an oscillating plate, which is oscillated by an electromagnetic force produced by a permanent magnet and a coil, so as to suitably control the fluid pressure within the fluid chamber, to thereby enable the elastic mount to exhibit different vibration damping characteristics depending upon the type of the input vibrations received.

In the known electrically controllable fluid-filled elastic mount constructed as described above, the operation of the oscillating plate cannot be suitably regulated so as to enable the elastic mount to exhibit satisfactory damping characteristics, since it is difficult to obtain a sufficiently large drive force to effectively actuate the oscillating plate.

Described more specifically, the above fluid-filled elastic mount suffers from insufficiency of the magnetic flux density in the magnetic field in which the coil is placed, because the magnetic circuit or path formed by the permanent magnet is open. In particular, the open magnetic circuit leads to insufficiency of the drive force to actuate the oscillating plate so as to effectively regulate the fluid pressure within the fluid chamber, when the elastic mount receives a vibrational load of medium to low frequencies having a relatively large amplitude.

Moreover, the open magnetic circuit formed by the permanent magnet is unable to provide a substantially constant magnetic flux density in the field in which the coil is placed, and therefore inevitably causes a large variation in the magnetic flux density applied to the coil when the oscillating plate is actuated or displaced in the oscillating manner. As a result, the drive force which acts on the oscillating plate tends to be unstable, making it difficult to effectively control the oscillating plate, whereby the waveform of the pulsation induced within the fluid chamber is distorted, causing a fluid pressure control distortion of the fluid chamber. Thus, the known electrically controllable fluid-filled elastic mount is not satisfactory in terms of its damping characteristics.

SUMMARY OF THE INVENTION

It is therefore an object of the present invention to provide a fluid-filled elastic mount having an oscillating plate partially defining a fluid chamber, which elastic mount is provided with a magnetic gap or field having a substantially constant and high magnetic flux density, which assures a sufficiently large drive force to actuate the oscillating plate so as to control the fluid pressure in the fluid chamber, thereby achieving desired vibration damping characteristics of the mount.

The above object may be achieved according to one aspect of the present invention, which provides a fluid-filled elastic mount comprising: a first and a second support which are spaced apart from each other; an elastic body which is interposed between the first and second supports for elastically connecting the first and second supports and which partially defines a fluid chamber filled with a non-compressible fluid; an oscillating plate which partially defines the fluid chamber and which is displaceable to change a pressure of the fluid in the fluid chamber; a permanent magnet disposed on one of opposite sides of the oscillating plate remote from the fluid chamber; a first and a second yoke member which are connected to respective opposite magnetic pole faces of the permanent magnet and which cooperate with the permanent magnet to define a closed magnetic circuit, the first and second yoke members defining therebetween an annular gap in the magnetic circuit; an annular moving coil received in the annular gap and fixed to the oscillating plate, the moving coil being displaced in the annular gap in an axial direction thereof, to oscillate the oscillating plate upon energization of the moving coil; and a magnetic fluid which fills the annular gap in which the annular moving coil is received, the magnetic fluid including magnetic particles dispersed in a liquid medium.

In the fluid-filled elastic mount of the present invention constructed as described above, the annular moving coil is disposed in the annular gap defined by and between the first and second yoke members, which cooperate with the magnet to define a closed magnetic circuit or path. Accordingly, the present arrangement is effective to minimize the amount of leakage of the magnetic flux, thereby increasing the magnetic flux density at the annular gap and improving the uniformity of the magnetic flux density.

Consequently, the moving coil is exposed to the sufficiently high density of magnetic flux, whereby an accordingly large magnetic force is produced to move the coil upon energization of the coil, irrespective of the axial position of the coil which varies over a predetermined range of operating stroke. This means a large drive force to oscillate the oscillating plate, assuring increased operating stability of the oscillating plate.

The increased operating stability of the oscillating plate with a large drive force assures improved accuracy and stability of regulation of the fluid pressure in the fluid chamber, and enhanced damping characteristics of the elastic mount.

Further, the presence of the magnetic fluid in the annular gap in which the coil is disposed leads to a further increase in the magnetic flux density at the annular gap and further improved uniformity of the magnetic flux density. Consequently, a sufficiently large drive force is exerted on the oscillating plate with high efficiency and stability.

BRIEF DESCRIPTION OF THE DRAWINGS

The above and other objects, features and advantages of the present invention will be better understood by reading the following detailed description of the preferred embodiment of the invention, when considered in connection with the accompanying drawings, in which.

DETAILED DESCRIPTION OF THE PREFERRED EMBODIMENTS

Figure 1:
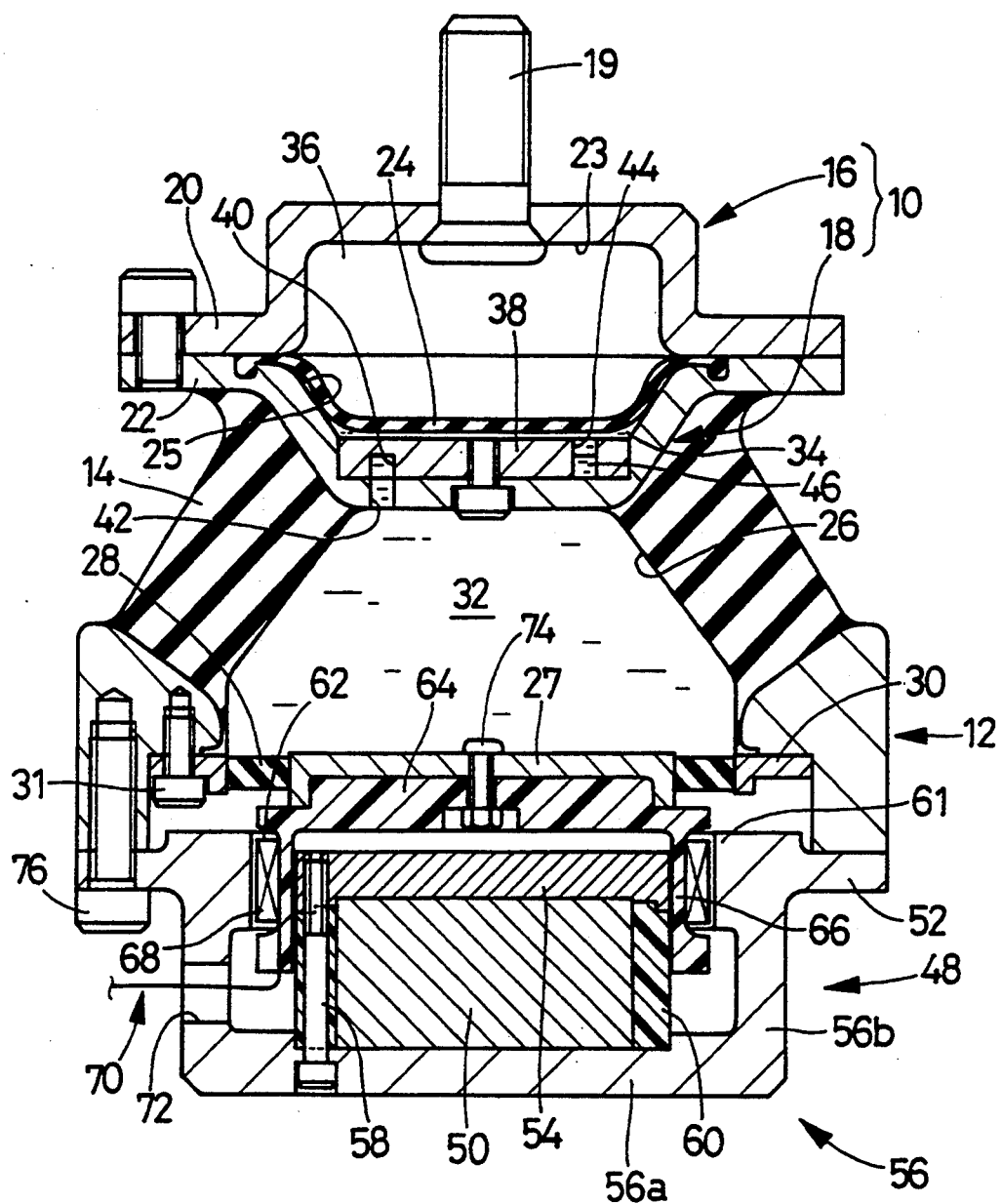
FIG. 1 is an elevational view in axial cross section of one embodiment of a fluid-filled elastic mount of this invention in the form of an engine mount for a motor vehicle.

Referring first to FIG. 1 showing an electrically controllable fluid-filled elastic engine mount for a motor vehicle, reference numerals 10 and 12 denote a first and a second support which are made of metals and are spaced apart from each other by a suitable distance in a load receiving direction in which the engine mount receives input vibrations. These two supports 10, 12 are elastically connected to each other by an elastic body 14 interposed therebetween. The engine mount is used to mount a power unit (including an engine) on the body of the vehicle, in a vibration damping fashion, such that the first and second supports 10, 12 are fixed to one and the other of the power unit and the vehicle body.

The first support 10 consists of an upper member 16 and a lower member 18 which are generally hat-shaped and have respective outward flanges 20, 22. The upper member 16 has a cylindrical portion defining a cylindrical recess 23, and the outward flange 20 extends radially outwardly from the open end of the cylindrical portion. The lower member 18 has a frusto-conical portion defining a frusto-conical recess 25, and the outward flange 22 extends radially outwardly from the open end of the frusto-conical portion. The upper and lower members 16, 18 are butted together at the outward flanges 20, 22 such that the cylindrical and frusto-conical recesses 23, 25 cooperate to define an enclosed space. The two members 16, 18 are bolted together to form the first support 10.

Within the enclosed space 23, 25 of the first support 10, there is disposed a generally frusto-conical flexible diaphragm 24. This diaphragm 24 is fixed with its peripheral portion being gripped by and between the opposed surfaces of the outward flanges 20, 22 of the upper and lower members 16, 18. The enclosed space 23, 25 is divided by the flexible diaphragm 24 into two fluid-tight sections corresponding to the two recesses 23, 25.

On the other hand, the second support 12 is a generally annular member having a relatively large diameter. The second support 12 is spaced by a suitable distance from the lower member 18 of the first support 10, in the axial direction which is parallel to the load receiving direction. The elastic body 14 is interposed between the first and second supports 12, 14 for elastic connection therebetween. This elastic body 14 has a generally frusto-conical shape and a generally frusto-conical bore, and is formed such that it is bonded at its small end to the frusto-conical outer surface of the lower member 18 of the first support 10, and at its large end to the axial end face of the second support 12. Thus, there is prepared an intermediate product consisting of the second support 12, the lower member 18 of the first support 10, and the elastic body 14 formed therebetween.

In the intermediate product 12, 14, 18, the frusto-conical bore of the elastic body 14 is closed at its small end by the bottom wall of the lower member 18. Thus, there is formed a frusto-conical recess 26 which is open at its large end to the bore of the second support 12.

Within the bore of the second support 12 communicating with the frusto-conical recess 26, there is disposed an oscillating plate 27 in the form of a circular disk having a relative small thickness, such that the oscillating plate 27 is coaxial with the support 12 and is located at the open end of the recess 26. This oscillating plate 27 is elastically supported by the second support 12, through an annular elastic support 28, which is secured to the second support 12 through an annular retainer ring 30 fixed to the inner surface of the support 12 by a plurality of bolts 31. That is, the annular elastic support 28 is interposed between and secured to the oscillating plate 27 and the retainer ring 30, so that the plate 27 is displaceable in the axial direction relative to the support 12, due to elastic deformation of the elastic support 28.

With the oscillating plate 27 elastically fixed to the second support 12 by the elastic support 28, the frusto-conical recess 26 is fluid-tightly enclosed to form a fluid chamber in the form of a pressure-receiving chamber 32 filled with a suitable non-compressible fluid, preferably water, alkylene glycol, polyalkylene glycol and silicone oil.

Since the pressure-receiving chamber 32 is partially defined by the wall of the elastic body 14, the pressure of the fluid in the chamber 32 changes due to elastic deformation of the elastic body 14 upon application of a vibrational load between the first and second support 10, 12 in the load receiving direction, i.e., in the axial direction of the engine mount.

The pressure-receiving chamber 32 communicates, through an orifice passage 46, with an equilibrium chamber 34 also filled with the non-compressible fluid. Namely, the equilibrium chamber 34 is defined by the flexible diaphragm 24 and a disk 38 accommodated in the frusto-conical recess 25 of the lower member 18 of the first support 10. The disk 38 is bolted to the bottom wall of the lower member 18, which functions as a partition which separates the pressure-receiving and equilibrium chambers 32, 34. The disk 38 has a circumferential groove 40 in the surface which contacts the bottom wall of the lower member 18. The circumferential groove 40 communicates with the pressure-receiving chamber 32 through a communication hole 42 formed through the bottom wall of the lower member 18, and with the equilibrium chamber 34 through a communication hole 44 formed through the disk 38. Thus, the groove 40 cooperates with the communication holes 42, 44 to define the orifice passage 46 for fluid communication between the two fluid chambers 32, 34.

The flexible diaphragm 24 elastically yields to permit a volumetric change of the equilibrium chamber 34 when the fluid flows into and from the equilibrium chamber 34 upon application of a vibrational load to the engine mount. Thus, the flexible diaphragm 24 absorbs a pressure change in the equilibrium chamber 34. The flexible diaphragm 24 and the upper member 16 of the first support 10 define an air chamber 36, which permits elastic deformation or displacement of the flexible diaphragm 24.

When a pressure change of the fluid occurs in the pressure-receiving chamber 32 due to the input vibration, the fluid is forced to flow through the orifice passage 46, between the two fluid chambers 32, 34, whereby the input vibration is damped based on the resonance of the fluid flowing through the orifice passage 46, as well known in the art. The orifice passage 46 is tuned, that is, the length and cross sectional area of the passage 46 are determined, so as to effectively damp low-frequency vibrations such as shake, based on the resonance of the fluid flowing through the orifice passage 46.

The engine mount is equipped with an electromagnetic drive device 48 for actuating the oscillating plate 27, which partially defines the pressure-receiving chamber 32. The drive device 48 is disposed on the side of the plate 27 remote from the pressure-receiving chamber 32.

The electromagnetic drive device 48 includes a cylindrical permanent magnet 50 having opposite magnetic poles or pole faces at its axially opposite ends. A ferromagnetic circular end disk 54 having a relatively large thickness is disposed in contact with the upper pole face of the permanent magnet 50. The end disk 54 has a diameter which is larger than that of the permanent magnet 50. Further, a cylindrical collar 60 is fitted on the outer circumferential surface of the magnet 50.

The permanent magnet 50 is accommodated in a ferromagnetic base member 56 including a bottom wall portion 56a and a cylindrical wall portion 56b, such that the lower pole face of the magnet 50 is in contact with a radially central portion of the bottom wall portion 56a of the base member 56. The base member 56 has an outward flange 52 at one of opposite axial ends of the cylindrical wall portion 56b remote from the bottom wall portion 56a.

The base member 56 and the end disk 54 are fixedly connected to each other by a plurality of screws 58 axially extending through the collar 60 such that the permanent magnet 50 is tightly gripped by and between the end disk 54 and the base member 56.

The base member 56 further has at the open end thereof an annular protrusion 61 which protrudes radially inwardly toward the periphery of the end disk 54. This annular protrusion 61 has an inner circumferential surface which is spaced a suitable distance from the outer circumferential surface of the end disk 54 in the radial direction.

The base member 56 and end disk 54 are both made of an iron or other ferromagnetic material, so that there is formed a closed magnetic path or circuit. An annular or cylindrical magnetic gap 62 is defined between radially opposed faces of the end disk 54 and the annular protrusion 61 of the base member 56 which partially define the closed magnetic circuit.

In the present embodiment, the end disk 54 functions as a first yoke member connected to the upper pole face of the permanent magnet 50, while the base member 56 functions as a second yoke member connected to the upper pole face of the magnet 50. These first and second yoke members cooperate with the magnet 50 to provide the closed magnetic circuit. The collar 60 fitted on the permanent magnet 50 and the screws 58 connecting the end disk 54 and the base member 56 are made of a nonmagnetic material such as an aluminum alloy, to prevent shorting of the magnetic circuit.

Above the end disk 54 partially defining the closed magnetic circuit, there is disposed with a suitable spacing a cylindrical movable member 64 made of a nonmagnetic material such as a synthetic resin or aluminum alloy. The movable member 64 has a cylindrical portion 66 extending through the above-indicated annular gap 62 between the end disk 54 and the annular protrusion 61 of the base member 56. To permit the movable member 64 to be axially movable over a suitable distance relative to the end disk 54, a small clearance is provided between the outer circumferential surface of the end disk 54 and the inner circumferential surface of the cylindrical portion 66.

Within the annular gap 62 in which the cylindrical portion 66 of the movable member 64 is positioned, there is disposed an annular moving coil 68 which is axially movable within the annular gap 62. The moving coil 68 is secured to the outer circumferential surface of the cylindrical portion 66 of the movable member 64, so that the movable member 64 is moved with the coil 68 when the coil 68 is moved with an electric current applied thereto as described below, through conductor wire 70 extending through hole 72 formed through the base member 56.

The axial length of the annular coil 68 is selected to be smaller than the axial length of the annular protrusion 61 of the base member 56 partially defining the annular gap 62, so that the coil 68 axially displaced within the gap 62 is always positioned within the axial length of the annular protrusion 61, in order to assure a substantially constant magnetic flux density applied to the coil 68, irrespective of the axial position of the coil 68.

Figure 2:
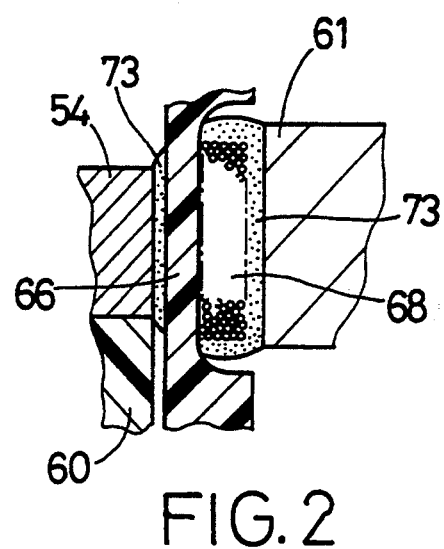
FIG. 2 is an enlarged view showing a portion of the engine mount of FIG. 1 corresponding to a part of a closed magnetic path or circuit including an annular gap.

Referring next to FIG. 2, a magnetic fluid 73 is injected into the annular gap 62 in which the cylindrical portion 66 of the movable member 64 and the annular coil 68 are disposed, so as to fill the clearances between the cylindrical portion 66 and coil 68, and the end disk 54 and the annular protrusion 61 of the base member 56. The magnetic fluid 73 is prepared by dispersing ferromagnetic particles such as iron or ferrite, in a liquid medium such as water or kerosene. Any known type of magnetic fluid may be used as long as it satisfies various conditions including its operating temperature and viscosity. For example, the viscosity of the magnetic fluid 73 should not be so high as to affect displacement of the movable member 64 in the annular gap 62.

The magnetic fluid 73, which is injected into the annular gap 62, is advantageously retained or maintained in the gap 62 as shown in FIG. 2, due to the ferromagnetic property of the magnetic fluid 73 and the magnetic field which is produced at the gap 62 formed in the closed magnetic circuit. Accordingly, the magnetic fluid 73 is held in the annular gap 62 so as to fill the clearances between the opposed surfaces of the end disk 54 and base member 56 (annular protrusion 61) defining the gap 62, and the cylindrical portion 66 of the movable member 64 and the annular coil 68 disposed between the opposed surfaces of the members 54, 56.

The electromagnetic drive device 48 thus obtained is attached, at the outward flange 52 of the base member 56, to the lower end of the second support 12 by means of screws 76. At the same time, the base wall of the movable member 64 is secured to the underside of the oscillating plate 27 by a bolt 74. In this condition, the annular moving coil 68 is located at an axially middle portion of the annular gap 62.

In operation of the engine mount constructed as described above, the moving coil 68 is energized by a controlled alternating current, whereby the coil 68 is subject to an electromagnetic force (Lorentz force) produced according to the Fleming's left-hand rule, so that the coil 68 is moved with the movable member 64. As a result, the oscillating plate 27 is displaced with a force proportional to the amount of electric current applied to the coil 68. The oscillating plate 27 is oscillated by controlling the current applied to the coil 68, depending upon the pressure change in the pressure-receiving chamber 32 due to the input vibrational load. Thus, the fluid pressure in the chamber 32 can be effectively regulated so as to change the damping characteristic of the engine mount, depending upon the type of vibration received.

Described in detail, when the frequency of the input vibration is relatively low, the oscillating plate 27 is oscillated in the same phase as the input vibration, so as to positively cause a fluid pressure change in the pressure-receiving chamber 32, for increasing the amount of the fluid which flows through the orifice passage 46, and thereby improving the damping effect based on the fluid flow through the orifice passage 46. When the frequency of the input vibration is in a medium or low band, the phase of oscillation of the oscillating plate 27 is reversed with respect to that of the input vibration, to thereby absorb the fluid pressure change in the chamber 32 or reduce the amount of the fluid pressure change, so that the engine mount exhibits an effectively reduced dynamic spring constant with respect to the medium to low frequency vibration.

In the electromagnetic drive device 48 of the present engine mount, the magnetic field to which the moving coil 68 is exposed has a sufficiently high magnetic flux density, with a reduced amount of magnetic flux leakage from the permanent magnet 50, since the magnetic field is produced at the annular gap 62 provided in the closed magnetic circuit or path. Consequently, upon energization of the moving coil 68, a sufficiently large magnetic force is produced to actuate the oscillating plate 27 so as to suitably regulate the fluid pressure in the pressure-receiving chamber 32, and thereby exhibit optimum damping characteristics depending upon the type of the input vibration.

Since the magnetic fluid 73 having a considerably higher magnetic permeability than air is provided in the annular gap 62 in which the annular moving coil 68 is disposed, the amount of magnetic flux leakage at the gap 62 is reduced assuring a further increased magnetic flux density. Upon energization of the moving coil 68, therefore, a comparatively large electromagnetic force is produced at the coil 68 whereby a drive force to actuate the oscillating plate 27 is accordingly increased.

As the magnetic field in which the moving coil 68 is placed is produced at the annular gap 62 in the closed magnetic circuit or path while the magnetic flux leakage is prevented by the magnetic fluid 73 present in the gap 62, the magnetic flux density in the magnetic field and the magnetic force produced are made uniform throughout the field, irrespective of the axial position of the coil 68 which is axially moved within the gap 62. This arrangement permits the produced magnetic force to be substantially proportional to the amount of electric current to be applied to the moving coil 68, whereby the oscillation of the oscillating plate 27 can be comparatively easily controlled, with an effectively reduced amount of distortion of waveform of the fluid pressure pulsation in the pressure-receiving chamber 32. Thus, the present engine mount is capable of intricately and precisely controlling the fluid pressure within the chamber 32, so as to exhibit improved vibration damping characteristics.

Further, the magnetic fluid 73 present in the annular gap 62 has a higher coefficient of heat transfer or heat conductivity than air, making it easy for the heat generated at the moving coil 68 to escape to the outside, i.e., toward the base member 56, so as to effectively avoid the temperature rise at the coil 68. This enables the moving coil 68 to receive a relatively large amount of electric current to produce an accordingly large electromagnetic force to effectively actuate the oscillating plate 27.

Moreover, the magnetic fluid 73 present in the annular gap 62 serves as a lubricant due to its viscosity. When the movable member 64 is displaced relative to the end disk 54 and the base member 56, therefore, the cylindrical portion 66 of the movable member 64 and the moving coil 68 are prevented from contacting and rubbing against the opposed surfaces of the members 54, 56 defining the annular gap 62, whereby chattering due to the contact is effectively reduced or avoided.

Furthermore, the magnetic fluid 73 is attracted to the opposite magnetic poles on the opposite sides of the magnetic gap 62, i.e., to the opposed surfaces of the end disk 54 and the annular protrusion 61, due to its own ferromagnetic property. Accordingly, the magnetic fluid 73 serves to hold or position the cylindrical portion 66 of the movable member 64 and the moving coil 68 in a radially intermediate portion of the annular gap 62, whereby the cylindrical portion 66 and the moving coil 68 are prevented from contacting the above-indicated opposed surfaces defining the gap 62. Consequently, the movable member 64 and the moving coil 68 can smoothly move relative to the end disk 54 and the base member 56, without suffering from damage of the coil 68 due to its contact with the base member 56 (annular protrusion 61), thereby assuring high durability of the engine mount.

While the present invention has been described in detail in its presently preferred embodiment with a certain degree of particularity, it is to be understood that the invention is not limited to the details of the illustrated embodiment, but may be otherwise embodied.

In the illustrated embodiment, the fluid chamber (pressure-receiving chamber 32) is held in communication with the equilibrium chamber 34 through the orifice passage 46. However, the present invention is applicable to a fluid-filled elastic mount which does not have such equilibrium chamber and orifice passage and which damps input vibrations by suitably regulating the fluid pressure in the fluid chamber (32) by the oscillating plate 27.

The permanent magnet and yoke members which cooperate to provide a closed magnetic circuit are not limited to the members 50, 54, 56 used in the illustrated embodiment, but may be suitably modified, in the configuration and construction, provided an annular gap accommodating an annular coil is formed behind the oscillating plate 27. For instance, the magnetic circuit may be defined by an annular permanent magnet having magnetic pole faces at its axially opposite ends, a first yoke member connected to one of the opposite magnetic pole faces of the magnet and extending through a center bore of the annular magnet toward the other magnetic pole face, and a second yoke member connected to the other magnetic pole face of the permanent magnet and cooperating with the first yoke member to define an annular gap therebetween.

While the first and second yoke members are prepared separately from the mount body in the illustrated embodiment, a part of the second support 12 may be utilized to provide a part of the yoke members.

In the illustrated embodiment, the axial length of the annular moving coil 68 positioned within the annular gap 62 is selected to be smaller than that of the annular protrusion 61 of the base member 56 partially defining the gap 62. However, the annular moving coil may have a larger axial length than the annular protrusion 61 so as to protrude from the annular gap 62. In this case, too, the annular gap 62 is surely given a substantially constant magnetic flux density, whereby the magnetic flux density applied to the annular coil is less likely to change even when the coil is displaced relative to the annular protrusion 61.

In the illustrated elastic mount, the first and second supports 10, 12 are secured to the opposite ends of the elastic body 14 such that these supports 10, 12 are opposed to each other with a spacing therebetween in the load-receiving direction. However, the present invention may be equally applicable to a so-called cylindrical elastic mount wherein inner and outer sleeves are disposed with a radial spacing therebetween, and are connected to each other by an elastic body interposed therebetween.

While the illustrated fluid-filled elastic mount is an engine mount for a motor vehicle, the principle of the present invention is equally applicable to other types of vehicle damping devices such as vehicle body mounts and differential gear mounts, and even to vibration dampers or elastic mounts used in various equipment or systems other than those for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
   a first and a second support which are spaced apart from each other;
   an elastic body which is interposed between said first and second supports for elastically connecting the first and second supports and which partially defines a fluid chamber filled with a non-compressible fluid;
   an oscillating plate which partially defines said fluid chamber and which is displaceable to change a pressure of the fluid in said fluid chamber;
   a permanent magnet disposed on one of opposite sides of said oscillating plate remote from said fluid chamber;
   a first and a second yoke member which are connected to respective opposite magnetic pole faces of said permanent magnet and which cooperate with said permanent magnet to define a closed magnetic circuit, said first and second yoke members defining therebetween an annular gap in said magnetic circuit;
   an annular moving coil received in said annular gap and fixed to said oscillating plate, said moving coil being displaced in said annular gap in an axial direction thereof, to oscillate said oscillating plate upon energization of said moving coil; and
   a magnetic fluid which fills said annular gap in which said annular moving coil is received, said magnetic fluid including magnetic particles dispersed in a liquid medium.

2. A fluid-filled elastic mount according to claim 1, wherein said magnetic particles of said magnetic fluid are iron or ferrite particles.

3. A fluid-filled elastic mount according to claim 1, wherein said liquid medium of said magnetic fluid consists of water or kerosene.

4. A fluid-filled elastic mount according to claim 1, wherein said permanent magnet consists of a solid cylinder having opposite axial ends as said opposite magnetic pole faces.

5. A fluid-filled elastic mount according to claim 4, wherein said first yoke member comprises a base member including a bottom wall portion and a cylindrical wall portion which cooperate to define a cylindrical space, said second yoke member comprising a circular disk disposed radially inwardly of said cylindrical wall portion, said solid cylinder being disposed within said cylindrical space such that one of said opposite axial ends of said solid cylinder of said permanent magnet is in contact with said bottom wall portion of said base men%her while the other of said opposite axial ends is in contact with said circular disk.

6. A fluid-filled elastic mount according to claim 5, further comprising fastening means for connecting said base member and said circular disk to said permanent magnet, said fastening means comprising a cylindrical collar fitted on said solid cylinder of said permanent magnet, and a plurality of screws extending through said collar.

7. A fluid-filled elastic mount according to claim 1, further comprising a movable member which is fixed to said oscillating plate and to which said annular coil is fixed to displace said oscillating plate with said movable member upon energization of said annular coil.

8. A fluid-filled elastic mount according to claim 1, wherein said fluid chamber is a pressure-receiving chamber, and further comprising a flexible diaphragm which partially defines an equilibrium chamber, and means for defining an orifice passage for fluid communication between said pressure-receiving and equilibrium chambers, said orifice passage being tuned to damp a vibrational load having a frequency within a predetermined range, based on resonance of said non-compressible fluid flowing through said orifice passage upon application of said vibrational load between said first and second supports.

* * * * *